United States Patent [19]

Nagase et al.

[11] Patent Number: 4,565,178
[45] Date of Patent: Jan. 21, 1986

[54] SUPERCHARGER CONTROL SYSTEM FOR INTERNAL COMBUSTION ENGINES

[75] Inventors: Hidenobu Nagase; Takayuki Hirayama, both of Saitama, Japan

[73] Assignee: Honda Giken Kogyo Kabushiki Kaisha, Tokyo, Japan

[21] Appl. No.: 573,832

[22] Filed: Jan. 24, 1984

[30] Foreign Application Priority Data

Jan. 24, 1983 [JP] Japan ................................. 58-9643

[51] Int. Cl.[4] ............................................. F02B 37/12
[52] U.S. Cl. ..................................................... 123/564
[58] Field of Search ........................ 60/600, 601, 611; 123/564

[56] References Cited

U.S. PATENT DOCUMENTS 4,227,372 10/1980 Kakimoto et al. ................ 60/611 X
4,434,775 3/1984 Yoshimura et al. ............... 60/611 X
4,466,414 8/1984 Yoshimura et al. ................ 123/564

FOREIGN PATENT DOCUMENTS 688899 3/1953 United Kingdom ................ 123/564
1437187 5/1976 United Kingdom ................ 60/611

OTHER PUBLICATIONS

SAE Paper No. 810006, Supercharging for Fuel Economy, Buike et al., 1981.

Primary Examiner—Michael Koczo
Attorney, Agent, or Firm—Lyon & Lyon

[57] ABSTRACT

A supercharger control system for an internal combustion engine wherein a control valve is advantageously placed in the inlet bypass of the supercharger. The control valve is activated and controlled by a combination of the throttle position and the pressure differential within the intake manifold. A linkage including a lost-motion mechanism connects the control valve to the engine throttle valve for limiting the closing of the control valve for supercharging to corresponding open positions of the throttle valve. A pressure differential device urges the control valve toward a closed position for supercharging upon the occurrence of a lower pressure at a venturi portion of the air intake than at a portion upstream thereof at the supercharger outlet.

6 Claims, 3 Drawing Figures

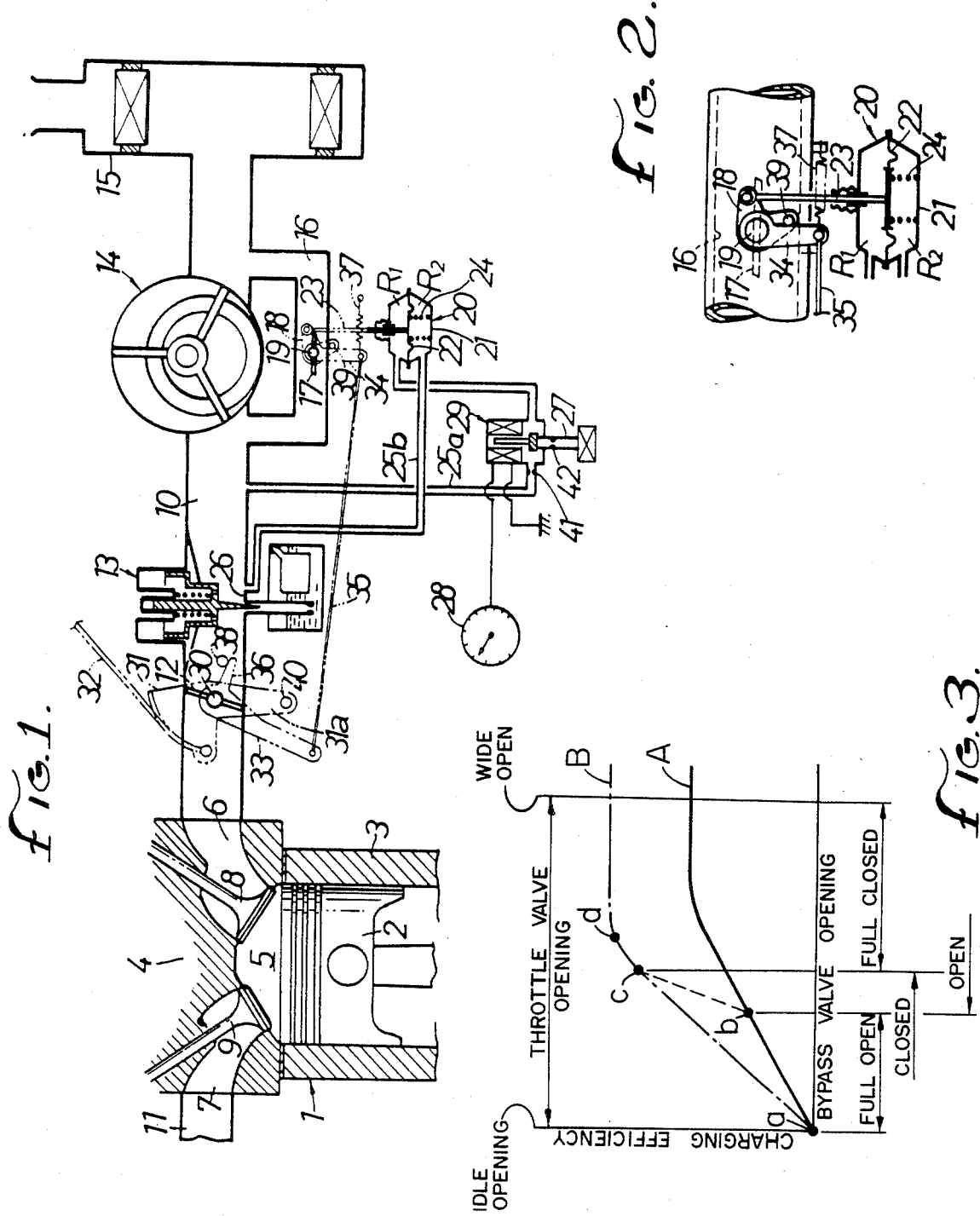

SUPERCHARGER CONTROL SYSTEM FOR INTERNAL COMBUSTION ENGINES

The field of the invention is supercharger control systems, and more particularly, supercharger control systems whereby regulation is accomplished by both throttle position and intake manifold pressure.

Due to the high cost of operating internal combustion engines, it has become desirable to increase the efficiency of vehicles using internal combustion engines. One method of decreasing the cost of such an operation is to supercharge the internal combustion engine to increase the power produced by such an engine while maintaining the efficiencies of a smaller engine. The internal combustion engine may be supercharged either by using a pump which is adapted to be mechanically driven by the engine or by using a compressor which is driven by the exhaust gasses from the internal combustion engine.

When such a supercharger system is used, it is necessary to limit the functions of the supercharging system in order to reduce engine power loss during idling, low-load and deceleration ranges, in which no supercharge required. Similarly, it is necessary to ensure that the supercharger is functioning to improve the power in the engine in the high-load range.

The present invention is directed to a system to control the activation and deactivation of superchargers in internal combustion engines. Such control maintains the advantages produced under high-load conditions while avoiding the detriments of using such a supercharged system under low-load conditions. The supercharger is located between the air inlet of the intake manifold and the intake manifold throttle valve. A control valve is advantageously located in the supercharger bypass. Closing the bypass control valve, thereby fully activating the supercharger, is limited by the position of the throttle and activated by the pressure differential between the supercharger exit pressure and the venturi carburetor pressure.

In accomplishing the foregoing control, an activation lever, whose rotation is limited in one direction by a stop pin, is pivotally mounted to the throttle. An activation linkage connects the activation lever with a regulating lever pivotally mounted about the control valve. A control lever is connected to the control valve. One end of the control lever is connected to an actuator. The actuator has a diaphragm device which responds to the pressure differential between the supercharger exit and the venturi carburetor and is biased by a spring so as to maintain the control valve in the fully open position. The other end of the control lever has a stop pin on it to selectively engage the regulating lever which is biased by a spring to maintain the control valve in the fully open position. Upon movement of the throttle valve, the throttle lever selectively engages the activation lever which, through the activation linkage, selectively disengages the regulating lever from the control lever stop pin. The actuator will then close the control valve to the extent of the pressure differential within the intake manifold. An electromagnetic valve controls the vehicular speed at which the supercharger will be disengaged by opening the bypass control valve. Fluctuations in pressure within the actuator are regulated by internal orifices to allow gradual activation or deterioration of the supercharger boost.

Accordingly, it is an object of the present invention to provide a supercharger control system which will activate the supercharger under high-load conditions and deactivate the supercharger under low-load, deceleration and idling conditions or excessive high speed conditions. It is a further object of the invention to provide a supercharger control system which is regulated by both the throttle position and intake manifold pressure. Other and more detailed objects of the invention will become apparent upon examination of the drawings and description contained herein, wherein:

FIG. 1 is a schematic view showing the overall construction of one embodiment of a supercharger control system;

FIG. 2 is an enlarged view showing the portion corresponding to the bypass valve; and, FIG. 3 is a graph illustrating the relationship between the supercharge efficiency and the opening and closing operation of the throttle valve and the bypass valve.

Turning in detail to the drawings, FIG. 1 illustrates an internal combustion engine body 1 which is constructed on a cylinder block 3 having a piston 2 slideably fitted therein, and a cylinder head 4 connected to a cylinder block 3 in an overlying fashion. A combustion chamber 5 is defined by the cylinder head 4 and the piston. Above the combustion chamber 5 there is an intake port 6 and an exhaust port 7 which are alternatively opened and closed by the action of an intake valve 8 and an exhaust valve 9, respectively. An intake passage 10 and an exhaust passage 11 are connected to the respective ends of the intake port 6 and the exhaust port 7.

In the intake passage 10 there is consecutively arranged from the downstream side thereof, a throttle valve 12 for opening and closing the intake passage 10, a venturi-type carburetor 13, a vane pump type supercharger 14 and an air cleaner 15. The supercharger 14 is adapted to be mechanically driven by the engine crankshaft through a conventional belt and pulley arrangement.

The intake passage 10 is constructed with a bypass passage 16 which avoids the supercharger 14. As shown in FIGS. 1 and 2, in this bypass 16 there is disposed a bypass valve 17 mounted about a pivot pin 19 for opening and closing the bypass 16. Affixed to the pivot pin 19 is a control lever 18 with two arms and formed substantially in the shape of a V. One arm of the control lever has a stop pin 39 on it; the other arm is connected to an actuator 20 through a connecting rod 23.

The actuator has a casing 21 formed about a diaphragm 22, thus partitioning the inside of the actuator 20 into a first compartment R1 and a second compartment R2. The actuator linkage 23 extends from the diaphragm 22 through the first compartment R1 to one end of the control lever 18. A spring 24 is disposed in the second compartment R2 for biasing the diaphragm 22 in a direction that tends to open the bypass valve 17.

The first compartment R1 is connected to a communication passage 25a with the intake passage 10 at the exit side of the supercharger 14. The second compartment R2 has a second communication passage 25b in communication with the venturi 26 of the carburetor 13. The first communication passage 25a is equipped at its middle portion with an atmospheric vent passage 27. The atmospheric vent passage 27 is adapted to be opened and closed by the action of an electromagnetic valve 29 which is controlled by a vehicular speed sensor 28.

In the preferred embodiment, the electromagnetic valve 29 operates to open the atmospheric communication passage 27 when the vehicular speed exceeds a predetermined value. Disposed in the first communication passage 25a is an orifice 41 which regulates the rate of pressure increase in the first compartment R1 due to the supercharger 14. The second orifice 42 is located in the atmospheric communication passage 27 to limit the discharge rate of the pressure from the first compartment R1 upon opening the electromagnetic valve 29.

A throttle operating lever 31 is integrally formed with the throttle valve 12 about a pivot pin 30. The upper end of the operating lever 31 is connected to a wire 32 which is connected to the not-shown accelerator pedal. Thus, the throttle valve 12 is opened by the depression of the accelerator pedal through the operating lever 31 and the wire 32 and is closed by the action of the not-shown return spring when the accelerator pedal is released.

Hinged about the pivot pin 30 is an actuation lever 33 with a stopper protrusion 36 formed thereon. The lower end of the actuation lever 33 is connected by an actuation linkage 35 to the lower end of the regulating lever 34 hinged about the bypass pivot pin 19. The stopper portion 36 is preferentially engaged with a stopper pin 38 anchored in the outer wall of the intake passage 10 by the tension of a return spring 37 which is connected to the regulating lever 34. This provides a lost-motion connection between the throttle valve 12 and control valve 17 to limit the operation of the control valve under certain conditions.

In the aforementioned state wherein the stopper 36 is in engagement with the stopper pin 38, a stopper pin 40 fitted in a protrusion 31a of the throttle control lever 31 is disengaged from the actuation lever 33. After the throttle valve 12 is opened to a predetermined position, the stopper pin 40 comes into engagement with and causes pivoting of the actuation lever 33 so that in turn the regulating lever 34 will be pivoted upon further opening of the throttle valve due to the actuation linkage 35 connecting the actuation lever 33 and the regulating lever 34. The magnitude of closing movement of the control valve 17 is regulated by the position of the throttle valve 12 when the regulation lever 34 is in contact with the stopper pin 39 in the control lever 18. Moreover, the bypass valve 17 is fully closed before the throttle valve 12 is fully opened. As a result, during the closing of the throttle valve 12, the bypass valve 17 begins to be opened when the throttle valve 12 is closed past a predetermined angle from its fully opened position. Although omitted from the drawings, the intake passage 10 and the bypass 16 are respectively equipped with members for regulating the fully opened position of the throttle valve 12 and the bypass valve 17.

The operation of this embodiment will be described hereinafter. FIG. 3 illustrates the relationship between the opening of a throttle valve 12, the opening of the bypass valve 17 and the charge efficiency of the engine. Curve A corresponds to the case in which the bypass valve 17 is fully opened in all ranges, i.e., the bypass valve 17 is in its fully opened position regardless of the position of the throttle valve 12 so that no supercharging is conducted at any time. Curve B corresponds to the case in which the bypass valve 17 is fully closed in all ranges, i.e., where the bypass valve 17 is in its fully closed position regardless of the position of the throttle valve 12 such that supercharging is conducted at all times.

In the idling, low-load and deceleration of the engine, the throttle valve 12 is slightly opened to the idling position. The stop pin 40 of the throttle operating lever 31 is apart from the actuation lever 33. As a result, the bypass valve 17 is held in its fully opened state by the tension in the return spring 37 and by the elastic force in the valve opening spring 24 in the actuator 20. While the supercharger 14 is still being driven by the engine, the engine power loss is reduced, as indicated by segment a-b in FIG. 3, due to the by-pass control valve 17 being in its fully open position.

In the high-load range of the engine, the throttle valve 12 is open such that the stopper pin 40 of the throttle operating lever 31 engages the actuation lever 33 and swings it in the same direction. As a result, the regulating lever 34 is swung in the same direction through the actuation linkage 35 to enable the bypass valve 17 to move, if indicated, as a result of the pressure differential in the intake manifold 10. As the throttle valve 12 is further opened, a vacuum in the venturi 26 of the carburetor 13 is introduced into the second compartment R2 through the second communication passage 25b. The pressure in the first compartment R1 as introduced through the first communication passage 25a, will be substantially atmospheric pressure. As a result, the downward force of the diaphragm resulting from the pressure differential overcomes the set load of the valve opening spring 24 so that the bypass valve 17 begins to be closed through the connecting rod 23, subject to engagement of the regulating lever 34 with the stop pin 39 of the control lever 18. As the bypass valve 17 closes, the supercharger 14 increases the charge efficiency, as indicated by segment b-c in FIG. 3.

As the supercharger 14 exhibits its supercharging function, the pressure differential between the first compartment R1 and the second compartment R2 continues the closing of the bypass valve 17.

If the regulating lever 34 is disengaged from the stop pin 39, the bypass valve 17 will fully close and the supercharger 14 will exhibit its maximum supercharging as indicated by d in FIG. 3.

When the throttle valve 12 is closed by a predetermined angle from its fully open position, regulating lever 34 is brought into engagement with the stop pin 39 of the control lever 18 to start opening the bypass valve 17 due to the tension in the return spring 37. As the pressure differential between the first chamber R1 and the second chamber R2 decreases, the bypass valve 17 will be fully opened by the elastic force of the valve opening spring 24 of the actuator 20 and the return spring 37.

In order to avoid excessive charge when the throttle valve 12 comes to its fully open position, an electromagnetic valve 29 which is actuated by a vehicular speed sensor 28 set at a predetermined speed, vents the pressure in the first communication passage 25a to the atmosphere through the atmospheric communication passage 27. This reduces the pressure differential between the first compartment R1 and the second compartment R2 of the actuator 20, which allows the bypass valve 17 to move toward an open position. Regulation of the flow through the first communication passage 25a by the first orifice 41, and regulation of flow through the atmospheric vent passage 27 through the second orifice 42, enables the bypass control valve 17 to become stable at a predetermined position. By finely adjusting the opening operation of the bypass valve 17 in the aforementioned manner, the supercharging function of the supercharger 14 can be deteriorated to regulate the vehicular speed to a predetermined value.

While described above in its preferred embodiment, the present invention is not intended to be limited by such a description, and may be equally applied to an internal combustion engine with a fuel injection system, or any other type of internal combustion engine.

We claim:

1. The supercharger control system for an internal combustion engine having a throttle valve with a throttle operating lever, an engine air inlet passage, a venturi-type carburetor, comprising, a supercharger located in the engine air inlet passage upstream of the throttle valve, said supercharger being driven by the engine, a bypass within the engine inlet passage around said supercharger, a control valve with a control lever attached thereto located within said bypass to control air flow therethrough, a diaphragm device, a first side of said diaphragm device being in communication with the engine inlet passage at the exit of said supercharger, a second side of said diaphragm being in communication with the venturi carburetor, a valve control linkage being constructed and arranged to open said control valve with increased vacuum in said first side of said diaphragm, spring means biasing said diaphragm to open said control valve, an activation lever with a stopper protrustion therefrom, said activation lever being pivotally mounted about the throttle valve, a first stop pin in the intake passage wall, a second stop pin on the throttle operating lever to selectively engage said activation lever, a regulation lever pivotally mounted about said control valve, a third stop pin on said control lever to selectively engage said regulating lever, an activation linkage connecting said activation lever and said regulating lever so as to create reciprocating motion therebetween, and spring means biasing both said regulating lever against said third stop pin when said control valve is in the fully open position and said stopper protrusion against said first stop pin.

2. The supercharger control system as set forth in claim 1 wherein the pressure in said first side of said diaphragm is regulated by an electromagnetic valve in said first communication passage, a vent to the atmosphere, a vehicluar speed sensor, said electromagnetic valve being activated by said vehicluar speed sensor for opening said vent above a predetermined vehicle speed.

3. The supercharger control system as set forth in claim 2 wherein said bypass control valve is arranged so as to be fully closed before the throttle valve is fully opened.

4. A supercharger control system for an internal combustion engine having an engine air inlet passage, a throttle valve in the inlet passage with a throttle operating lever, a supercharger located in the engine air inlet passage upstream of the throttle valve and being driven by the engine, and a bypass within the engine inlet passage around said supercharger, comprising, a control valve located within said bypass to control air flow therethrough, a pressure differential operated diaphragm device having a first side of a diaphragm in communication with the engine inlet passage at the exit of said supercharger and a second side in communication with a venturi portion of the air inlet passage downstream thereof, means connecting said control valve and said diaphragm device for closing said control valve with increased pressure in said first side of said diaphragm relative to said second side, spring means biasing said diaphragm toward opening said control valve, and means connecting said throttle valve to said control valve including a lost-motion mechanism for limiting the closing movement of said control valve in relationship to the opening of said throttle valve.

5. The supercharger control system of claim 4 wherein said lost-motion mechanism includes means for causing full opening of said control valve at small opening positions of said throttle valve.

6. The supercharger control system of claim 4 wherein said diaphragm device includes means for reducing the pressure on said first side of said diaphragm as a result of high vehicle speed without regard for the pressure at the exit of said supercharger to allow opening of said control valve and reducing the supercharging effect.

* * * * *